US007905543B2

(12) United States Patent
Ito

(10) Patent No.: US 7,905,543 B2
(45) Date of Patent: Mar. 15, 2011

(54) SAFETY DEVICE IN OPENING-CLOSING DEVICE OF A VEHICLE

(75) Inventor: Yoshiyasu Ito, Tochigi (JP)

(73) Assignee: Yachiyo Industry Co., Ltd., Saitama (JP)

(*) Notice: Subject to any disclaimer, the term of this patent is extended or adjusted under 35 U.S.C. 154(b) by 289 days.

(21) Appl. No.: 12/195,882

(22) Filed: Aug. 21, 2008

(65) Prior Publication Data

US 2009/0049750 A1 Feb. 26, 2009

(30) Foreign Application Priority Data

Aug. 21, 2007 (JP) ................................ 2007-214233

(51) Int. Cl.
*B60J 7/057* (2006.01)

(52) U.S. Cl. .................... 296/223; 296/155; 296/216.02; 49/26

(58) Field of Classification Search .................. 296/223, 296/155, 216.02; 49/26–28
See application file for complete search history.

(56) References Cited

U.S. PATENT DOCUMENTS 7,221,118 B2* 5/2007 Sasaki et al. .................. 318/282
2001/0013714 A1* 8/2001 Ochiai et al. .................. 296/223
2009/0211156 A1* 8/2009 Appel ................................ 49/28

FOREIGN PATENT DOCUMENTS

JP 2003-278443 A 10/2003
JP 2005-290938 A 10/2005
JP 2006-327353 A 12/2006

* cited by examiner

*Primary Examiner* — Dennis H Pedder
(74) *Attorney, Agent, or Firm* — Arent Fox LLP

(57) ABSTRACT

A safety device in a closing-opening device of a vehicle which is provided with millimeter wave sensors as a detection device enables detecting an obstacle accurately for preventing a caught-in accident in advance caused by the closing-opening device.

18 Claims, 10 Drawing Sheets

SAFETY DEVICE IN OPENING-CLOSING DEVICE OF A VEHICLE

FIELD OF THE INVENTION

The present invention relates to a safety device in an opening-closing device of a vehicle such as a sun roof device thereof.

BACKGROUND OF THE INVENTION

There has been a prior technology known to public for a sun roof device of a vehicle equipped with a device, which stops the roof panel that is closing or moves it in the reverse direction to open on detecting a load applied to the roof when an obstacle like a hand hits the roof panel. However this device can not prevent the obstacle from coming in contact with the roof panel because the device works only when a load larger than predetermined is applied to the roof panel.

Alternatively, Japanese Laid-Open Patent Application No. 2003-278443 discloses a technology in which is provided a distance detecting device for detecting a distance between an opening-closing unit of a vehicle and the obstacle, and this device stops the opening-closing unit or reverses the direction in which the opening-closing unit moves, based on the distance detected thereof. Therefore, it is possible to prevent the obstacle from coming in contact with the sun roof panel by utilizing this technology and the safety for the roof panel is expected to improve because an accident like a hand getting caught in the roof panel device can be prevented.

Explaining an embodiment in Japanese Laid-Open Patent Application No. 2003-278443 by using codes in the document, as explained in the paragraph 0033, a closure distance, Ls, from a closing edge 5 of a slide door 3 to an opening side 6 which is detected by ultrasonic sensors 21, 22 and 23, is compared with a distance from a closing edge 5 to an opening side 6 which is measured by a pulse signal outputted from a hole IC 14. If both distances are equal, it is determined that there is no obstacle 24. If the distance of Ls is shorter than that of the latter distance, it is determined that there is an obstacle 24.

SUMMARY OF THE INVENTION

However, there is a problem with the method using an ultrasonic sensor for detecting a distance on accuracy of the detection. An objective of the present invention is to provide a safety device in an opening-closing device of a vehicle which is equipped with millimeter wave sensors having a superior weather-proof property and capable of detecting an obstacle.

In order to solve the problem, the present invention provides a safety device in an opening-closing device of a vehicle, the opening-closing device including an opening-closing unit for opening to form an opening area on a vehicle body and closing the opening area, the safety device comprising, a millimeter wave sensor attached on the vehicle body, a memory for memorizing a reference data on a periphery of the opening area, the reference data which is associated with a position of the opening-closing unit and measured by the millimeter wave sensor in advance without an obstacle in the opening area, a comparison determination device for comparing a measured data on the periphery of the opening area, the measured data which is continually measured by the millimeter wave sensor attached on the vehicle body while the opening-closing unit is closing, with the reference data memorized in the memory for the same position of the opening-closing unit as the position for the measured data to be compared, and determines whether there is an obstacle or not in the opening area based on a difference between the measured data and the reference data, and a movement control device for changing a movement of the opening-closing unit to a pre-determined movement if the comparison determination device determines that there is the obstacle in the opening area.

According to the safety device of the present invention, the periphery shape of the opening area that is influenced by periphery's movement is accurately measured. Accordingly, reliability of the reference data, resolution of the measured data, information quantity and data accuracy is improved. As a result, the detection of an obstacle becomes more accurate.

The present invention provides the safety device of an opening-closing unit of a vehicle, wherein the opening-closing unit is driven by a pulse motor and the comparison determination device specifies the position of the opening-closing unit based on a pulse count value of the pulse motor.

Since the safety device of the present invention can utilize an existing pulse-controlled system, the safety device is manufactured easily at a low cost.

The present invention provides the safety device of an opening-closing device of a vehicle, wherein a detectable area of the millimeter wave sensors is set to an area on a closing side edge of the opening area.

According to the safety device of the present invention, it is not necessary to attach many millimeter wave sensors, and the incidence of detection errors is decreased because the detection area to cover is limited.

The present invention provides the safety device in an opening-closing device of a vehicle, further comprising a position discrepancy determination device which compares the measured data when a difference arises between the measured data and the reference data with at least one of a predetermined number of the consecutive reference data prior to and after the reference data, determines that there is a position discrepancy on the opening-closing unit if the measured data is identical with either of the compared reference data and determines that there is the obstacle in the opening area if the measured data is not identical with any of the compared reference data.

According to the safety device of the present invention, a detection error caused by a factor other than an obstacle can be decreased. As a result, accuracy for detecting an obstacle becomes higher.

The present invention provides the safety device in an opening-closing device of a vehicle, wherein the opening-closing unit is a roof panel of a sun roof device which slides forward and backward to open and close and of which a front edge portion is in a gently curved convex shape, and wherein the millimeter wave sensor is attached on each side edge of the opening area so that no area in the opening area located on a half portion of a front edge from a center of the front edge remains a blind spot which the millimeter wave does not reach due to the gently curved convex shape.

Since a roof panel of a sun roof device is usually in a gently curved convex shape whose top comes at a center of a front edge, if a millimeter wave is emitted in the right-left direction of a vehicle by only a millimeter wave sensor attached on one side edge of an opening area, there is a blind spot which is located on a half portion of the front edge across the center of the front edge from the side edge of the opening area where the millimeter wave is emitted and a millimeter wave does net reach. On the contrary, there remains no blind spot according to this invention because a millimeter wave sensor is attached on each side edge of the opening area. Accordingly, a detectable area of an obstacle is enlarged.

The present invention provides the safety device of an opening-closing device of a vehicle, wherein the sunroof device comprises a sunshade panel disposed under the roof panel, each side edge of which is supported by a guide rail, and wherein the millimeter wave sensor is attached on each of the guide rails.

According to the safety device of the present invention, in a sun roof unit with a sun shade panel, a space to attach millimeter wave sensors is efficiently reduced.

The present invention provides the safety device in an opening-closing device of a vehicle, wherein the opening-closing unit is a roof panel of a sun roof device, which is configured to be tilted up, and wherein the obstacle is detected by the millimeter wave sensor when the roof panel is sliding as well as when the roof panel is tilting down.

According the safety device of the present invention, the obstacle in the sun roof device is detected by the millimeter wave sensor when the roof panel is sliding as well as when the roof panel is tilting down. As a result, higher safety is ensured.

DETAILED DESCRIPTION OF THE PREFERRED EMBODIMENT

The present invention provides a safety device having a superior accuracy for detecting an obstacle.

First Embodiment

Figure 1:
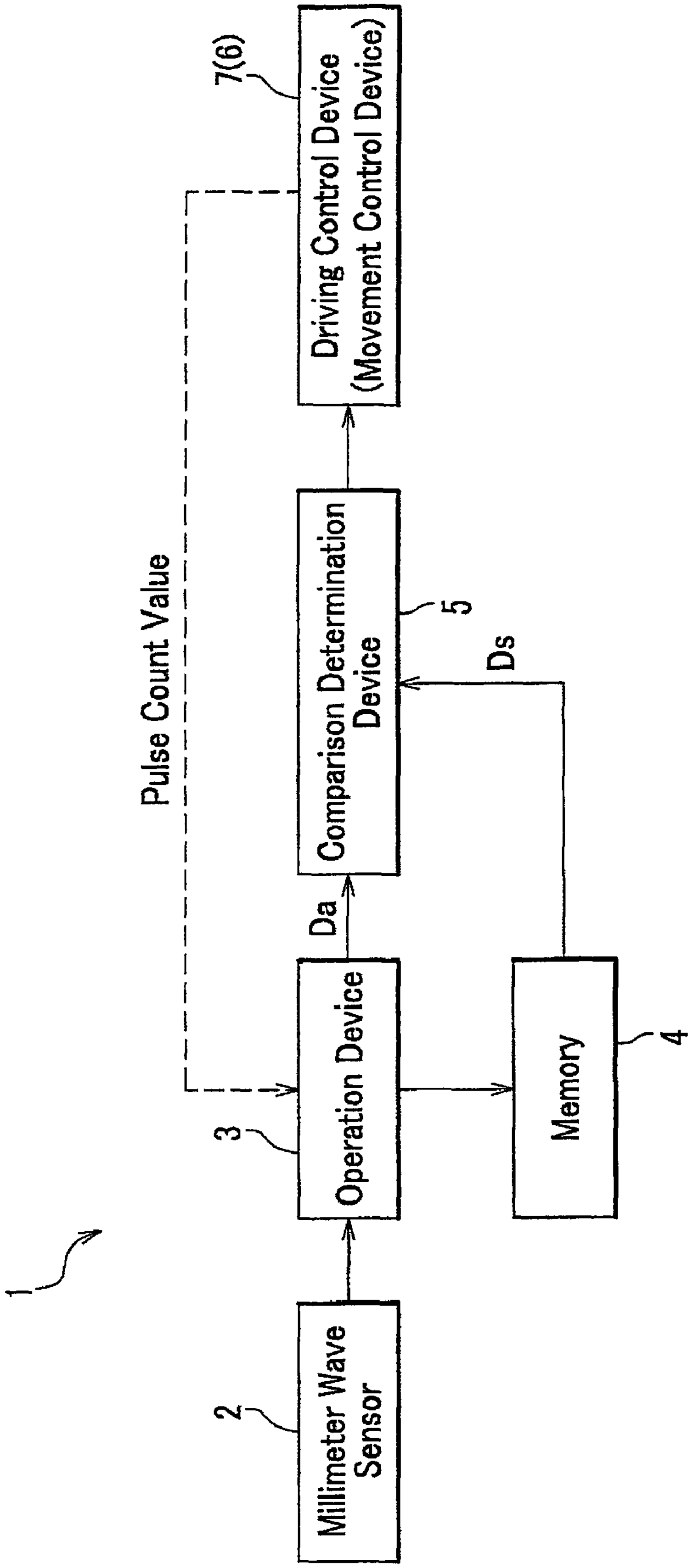
FIG. 1 is a block schematic diagram for a safety device of the present invention.
Figure 2:
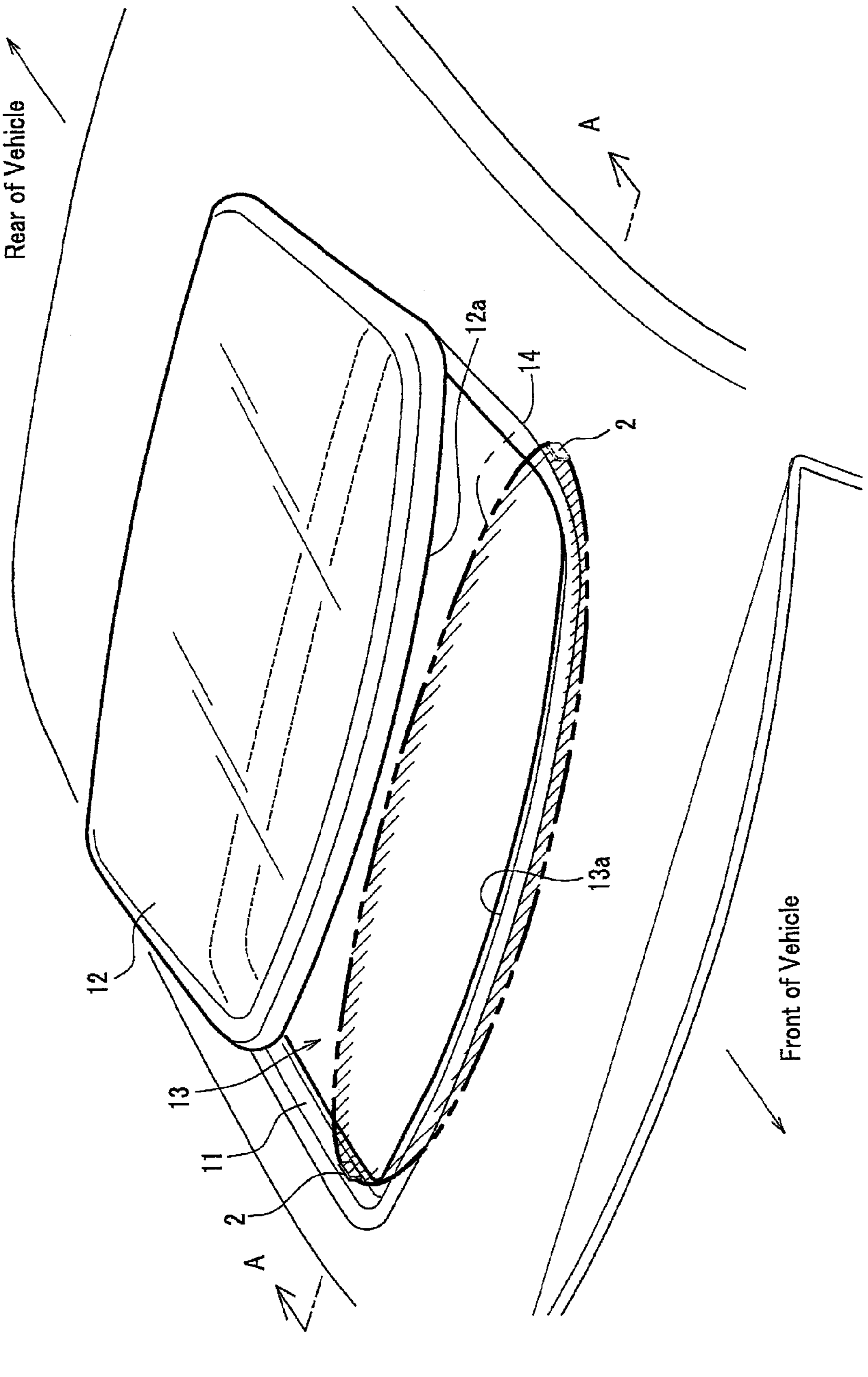
FIG. 2 is a perspective exterior view of a sunroof unit.
Figure 3:
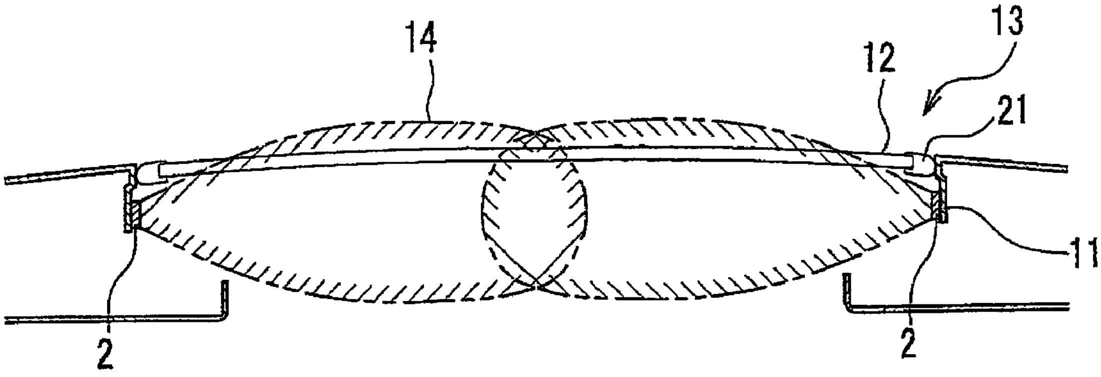
FIG. 3 is an A-A cross sectional view in FIG. 2.

Firstly an embodiment applied to a sun roof is to be explained. FIG. 1 shows a block schematic diagram for a safety device of the present invention. FIG. 2 shows a perspective exterior view of a sun roof device. FIG. 3 is an A-A cross section drawing in FIG. 2. The sun roof device shown in FIG. 2 is a so-called outer slide type, and an opening area 13 is formed when a roof panel 12 functioning as an opening-closing unit, being kept tilted up, slides backward.

Referring to FIG. 1 and FIG. 3, the following is understood. The safety device 1 comprises, millimeter wave sensors 2, a memory 4, a comparison determination device 5, and a movement control device 6.

The millimeter wave sensors 2 are attached on a body of a vehicle (vehicle body 11). The memory 4 memorizes reference data Ds on the periphery of an opening area 13, which are associated with the position of an opening-closing unit (a roof panel 12) and measured by millimeter wave sensors 2 in advance without any obstacle. The comparison determination device 5 compares the measured data Da on the periphery of the opening area 13 which are measured by the millimeter wave sensors 2 attached on the body side of the vehicle (the vehicle body 11) while the roof panel 12 is closing with the reference data Ds memorized in the memory 4, and determines whether there is an obstacle or not in the opening area 13 based on a difference between the data Ds and Da. The movement control device 5 controls a movement of the roof panel 12 by changing the movement to the pre-determined movement if the comparison determination device 5 determines that there is an obstacle.

The millimeter wave sensor 2, for example, transmits a transmission wave around 60 GHz from an antenna and receives a reflection wave from an object through the antenna. A couple of millimeter wave sensor 2 are attached on the vehicle body 11 under the left and right edges of the opening area 13 as shown in FIG. 2 and FIG. 3. In the present invention, a "body of a vehicle" on which millimeter wave sensors 2 are attached refers to the vehicle body as a fixed object, a bracket fixed on the vehicle body and guide rails 23 as described below, in comparison with the roof panel 12 as a movable object. The figure mainly gives an outline of the antenna of the millimeter wave sensor 2, and omits a controller including the operation device 3 and so on as mentioned later. As an attached position of the millimeter wave sensor 2, a front edge 13*a* of the opening area 13 can be used.

As is indicated in the present embodiment, if the millimeter wave sensors 2 are arranged on both sides of the opening area 13, both millimeter wave sensors 2 car have an identical specification and emitting millimeter waves of an identical frequency, because no interference between the millimeter waves emitted from both millimeter wave sensors 2 occurs if both millimeter wave are emitted alternately by turns at a constant interval. Of course, to prevent interference, millimeter waves of different frequencies may be used for both millimeter wave sensors 2.

Figure 9:
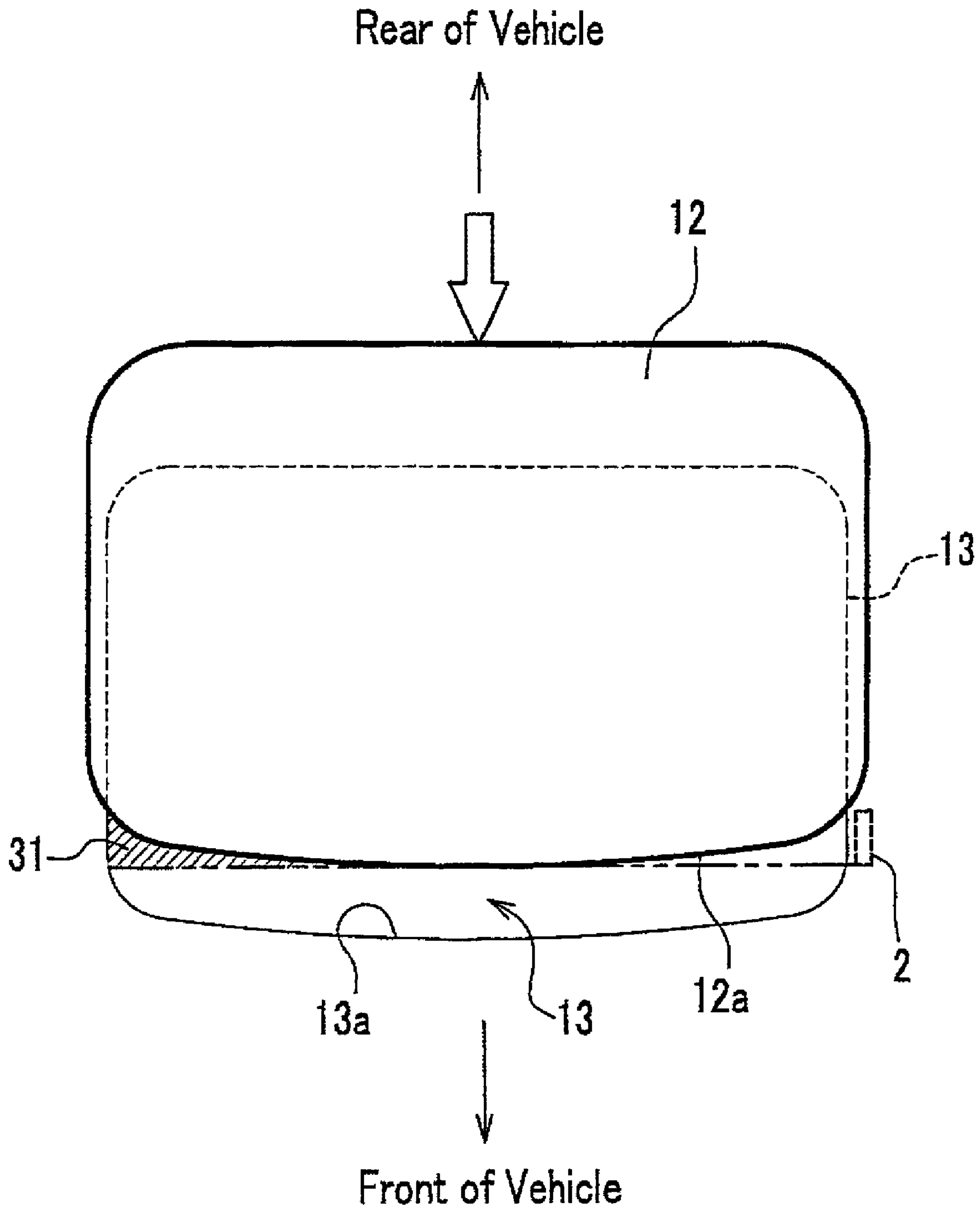
FIG. 9 is a plan figure showing a situation where a blind spot area appears if a millimeter wave sensor is attached only on one side edge of the opening area.

If the millimeter wave sensors 2 are attached on both side edges of the opening area 13, the following effect is expected. The roof panel 12 of the sun roof device usually has a front edge 12*a* which is in a gently curved convex shape whose peak comes at a center of the front edge 12*a* as shown in FIG. 9. As a result, an area on a half portion of the front edge 12*a* across a center of the front edge 12*a* from the side edge, on which a millimeter wave sensor 2 is attached, becomes a blind spot 31 which a millimeter wave does not reach, if the millimeter wave sensor 2 is attached only on one side edge of the opening area 13 and a millimeter wave is emitted in a lateral direction of a car. The blind spot 31 is gradually enlarged as the roof panel 12 is closing. To resolve this problem, the millimeter wave sensors 2 are attached on both side edges of the opening area 13 so that millimeter waves are emitted from both side edges. As a result, the blind spot 31 becomes a detectable area 14 for an obstacle.

It is possible to have the detectable area 14 include the whole area of the opening area 13 indicated in FIGS. 2 to 4 that is totally open. However, since it is difficult to set a large transmission angle of millimeter waves, the number of the millimeter wave sensors 2 needs to be increased. Accordingly, the detectable area 14 is disposed on the closing side edge of the opening area 13 (the front edge 13*a* shown in FIG. 1), that is, a front portion of the opening area 13. Since this detectable area 14 is an area on the roof panel 12 that is completely closed, a heavy load is exerted on a driving power source for the roof panel 12 when a part of the roof panel 12 comes into the detectable area 14. The heavy load is due to an increase in friction force resulting from a enlarged contact area between a weather-strip 21 of the roof panel 12 and the vehicle body. According to a conventional technology detecting a load applied by an obstacle such as a hand, a driving source for a roof panel is stopped or a direction of the movement is changed based on a detection threshold load in the area to determine whether an obstacle comes in or not. The detection threshold load in this area has to be set higher than in the other areas in accordance with the increase in the friction force in order to prevent a detection error in accordance with the increase. However, according to the present invention using the millimeter wave sensors 2, it is possible to eliminate the problem with the threshold load set to determine whether an obstacle comes in or not. Of course, by using the conventional method and the present invention together, it is possible to detect an obstacle coming in more reliably.

Figure 4A:
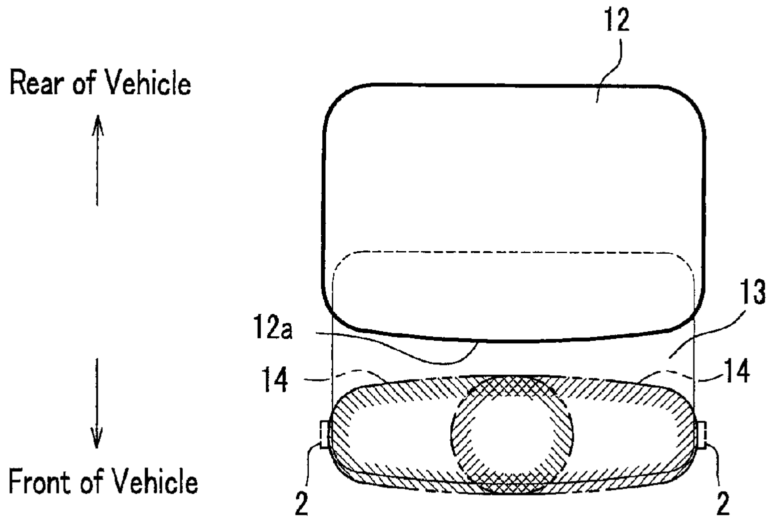
FIGS. 4A, 4B and 4C are a set of plan views showing a roof panel closing without an obstacle.
Figure 4B:
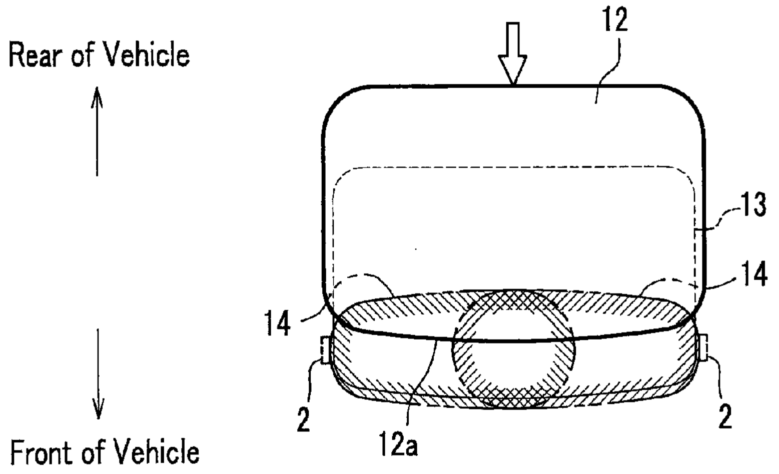
Figure 4C:
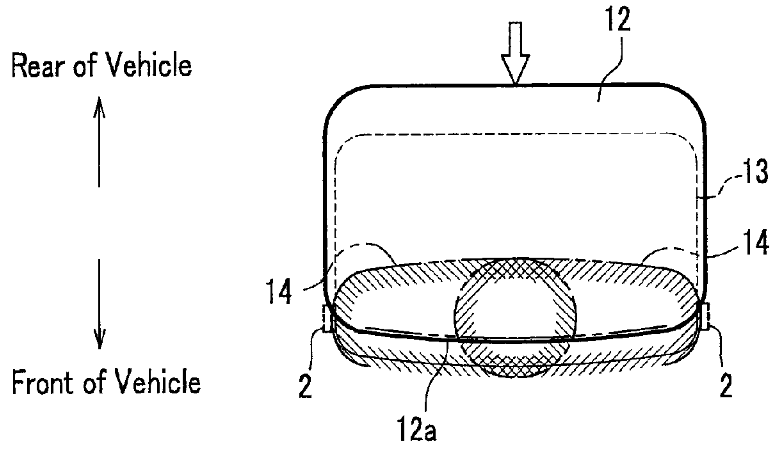

The operation device 3 shown in FIG. 1 produces reference data Ds and measured data Da, both of which are on a periphery of the opening area 13, based on output signals of the millimeter wave sensor 2. Both the reference data Ds and the measured data Da are associated with and measured for the opening-closing position of the roof panel 12 in the detectable area 14. FIG. 4 shows plan figures showing the roof panel 12 that is closing without an obstacle. FIG. 4A shows the roof panel 12 whose front edge is outside the detectable area 14 of millimeter waves. FIG. 4B shows the roof panel 12 whose front edge come partly within the detectable area 14. FIG. 4*c* shows the roof panel 12 whose front edge is almost completely within the detectable area 14. The information on the existence of the roof panel 12 and the position information becomes background data for absence of an obstacle, which constitutes the reference data Ds.

In the present invention, the reference data Ds memorized in the memory 4 are not limited to the data measured by the millimeter wave sensors 2 attached on each vehicle. For example, Ds can be simulation data measured by the millimeter wave sensors 2 for a test sun roof device in advance. However, the detection becomes more accurate if the data measured by the millimeter wave sensor 2 attached on each vehicle is memorized in the memory 4 as the reference data Ds when each vehicle is shipped, considering attachment errors of the sun roof device and the millimeter wave sensor 2 on each vehicle.

When the comparison determination device 5 compares the measured data Da and the reference data Ds both associated with the position of the roof panel 12, that is, the comparison determination device 5 specifies the position of the roof panel 12, a pulse count value of the pulse motor 15 can be utilized. The pulse motor 15 is a driving power source for the roof panel 12.

Figure 6:
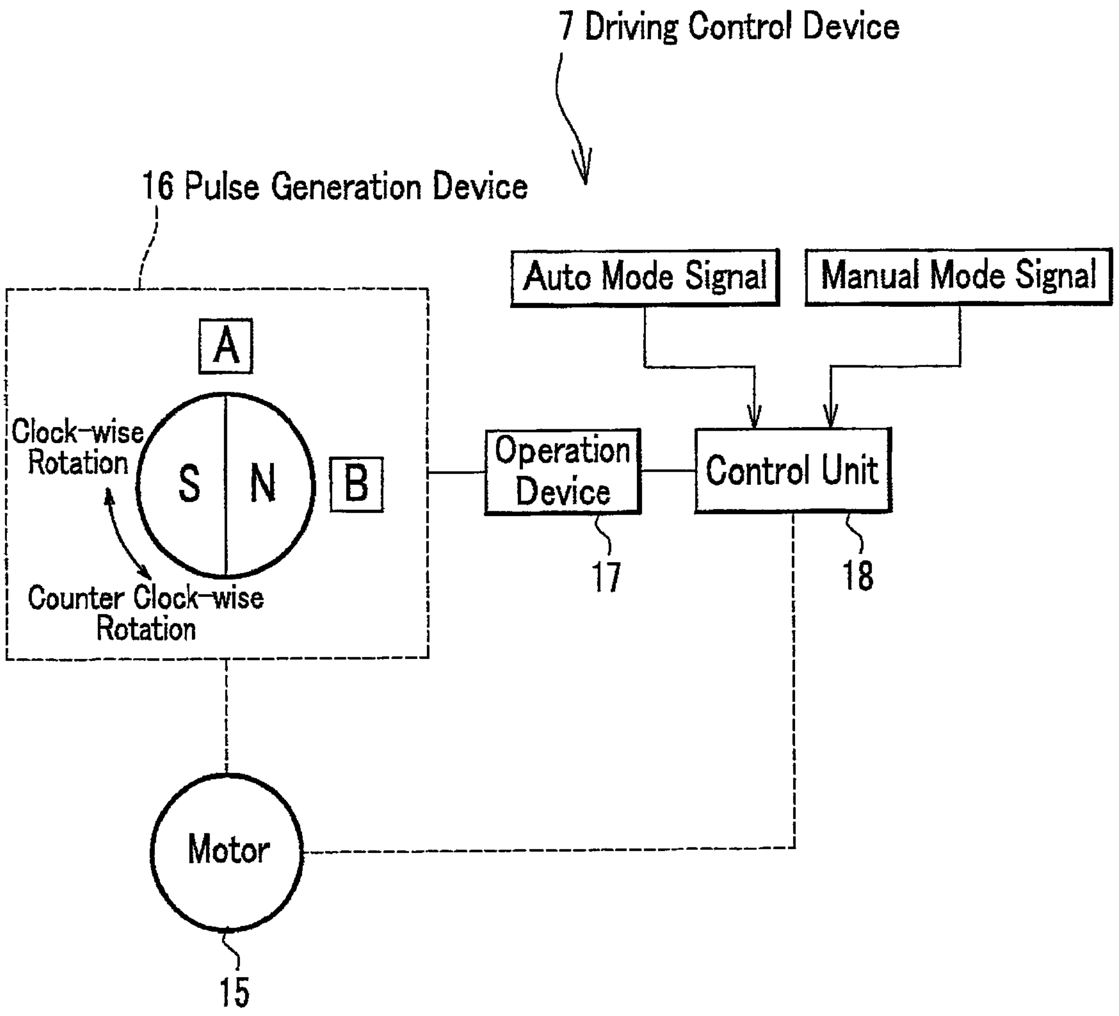
FIG. 6 is a block schematic diagram showing an example of a driving control device for a roof panel.

FIG. 6 is a block schematic diagram showing an example of a driving control device 7 for the roof panel 12. The driving control device 7 is provided with, a motor 15 for driving the roof panel 12, a pulse generation device 16 generating a pulse based on a rotation of the motor 15, an operation device 17 which counts up and counts down a pulse count value relative to a locked position where the roof panel 12 hits a stopper not shown in FIG. 6 and mechanically locked, and a control unit 18 for controlling the motor 15 corresponding to an signal output from the operation device 17. The pulse generation device 16, for example, is a known pulse generation device, comprising a rotor composed of magnets, and sensors A, B of a pair of hall ICs. The pulse generation device can detect a rotating direction of the rotor, namely, a rotating direction of the motor as well as a pulse count value of the pulse motor.

The control unit 18 receives either an automatic mode signal or a manual mode signal. In the automatic mode, a slide roof 21 automatically performs a tilting movement or a sliding movement up to a stop position once an operation switch not shown is switched on. In the manual mode, the slide roof 21 performs the tilting movement or the sliding movement only while the operation switch is kept on.

Figure 5:
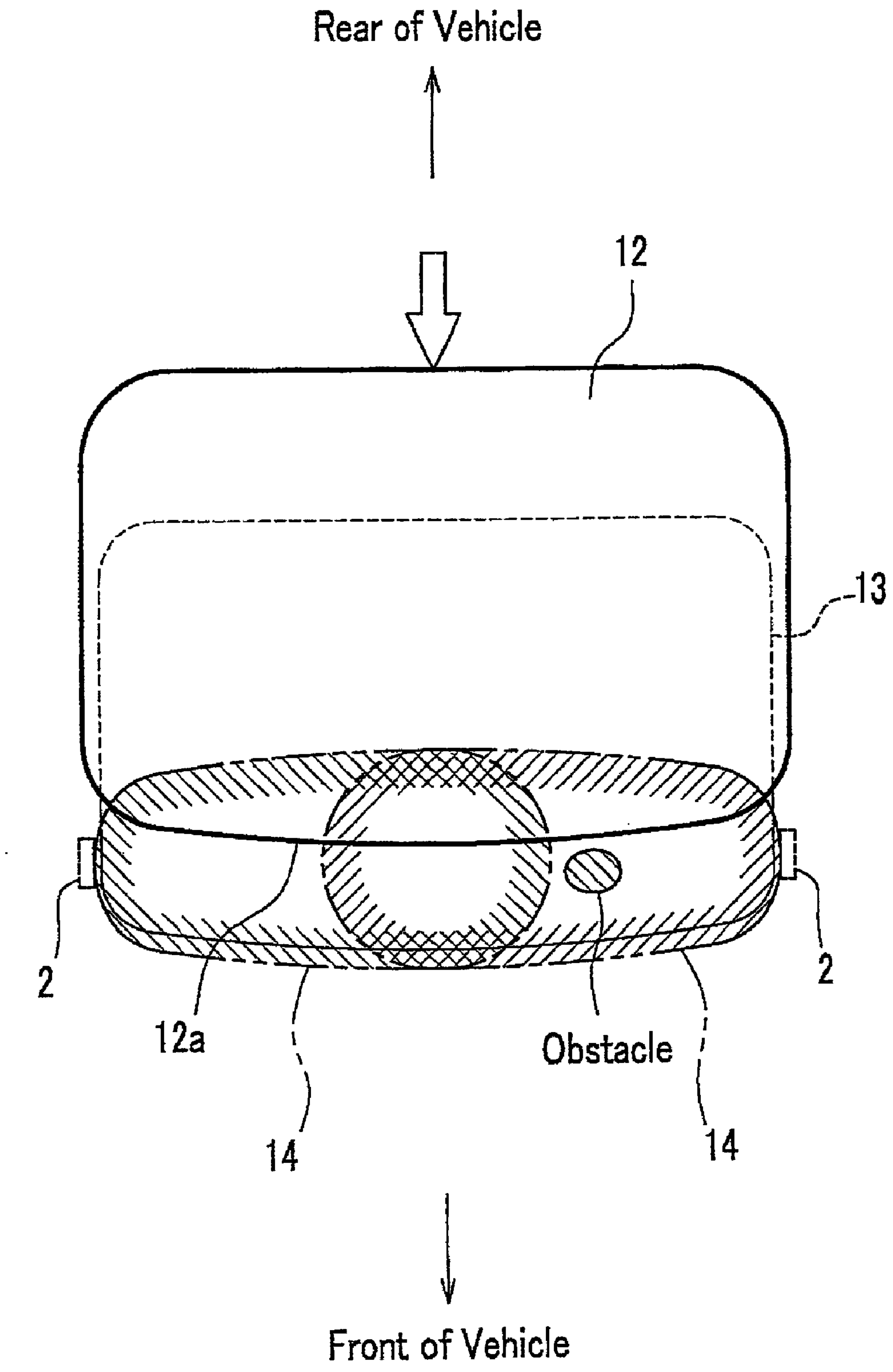
FIG. 5 is a plan figure showing an example in which an obstacle is present in a detectable area.

Accordingly, by producing the reference data Ds and the measured data Da both associated with, a pulse counts value of the motor 15, the data Ds and Da are easily compared with reference to the position of the roof panel 12. Then, the comparison determination device 5 determines that there is no obstacle in the opening area 13 if a difference between both data Ds and Da is 0 or a value within a pre-determined range, and that there is an obstacle in the opening area 13 if the difference between both data Ds and Da is larger than a value in a pre-determined range, when an obstacle like a hand comes in the detectable area 14 as shown in FIG. 5.

If the comparison determination device 5 determines that there is an obstacle, a movement of the roof panel 12 is changed from a usual closing movement to a pre-determined movement. The pre-determined movement includes net only closing movement at a decreasing speed, but also a stop and a reverse direction movement (movement for the roof panel 12 to open). But, from a safety point of view, it is favorable to stop or move in the reverse direction the roof panel 12. The driving control device 7 can be used for the movement control device 6.

As mentioned above, the following effect is expected by using the safety device 1. Herein, the safety device 1 comprises the millimeter wave sensors 2, the memory 4, the comparison determination device 5, and the movement control device 6. The millimeter wave sensors 2 are attached on the vehicle body 11.

The memory 4 memorizes the reference data Ds on the periphery of the opening area 13. Each of the reference data Ds is measured by the millimeter wave sensors 2 in advance without any obstacle for a position of the roof pane 12 and the reference data Ds is associated with the position of the roof pane 12.

The comparison determination device 5 compares a measured data Da on the periphery of the opening area 13 with the reference data Ds memorized in the memory 4, which is associated with the position of the roof panel 12. The measured data is measured and outputted by the millimeter wave sensors 2 attached on a vehicle body 11 while the roof panel 12 is closing. Then, the comparison determination device 5 determines whether there is an obstacle or not in the opening area 13 based on the difference between the data Da and Ds.

The movement control device 6 controls the roof panel 12 by changing the movement to the pre-determined movement if the comparison determination device 5 determines that there is an obstacle.

Resolution, information quantity, and reliability on data accuracy of the reference data Ds and the measured data Da are to be improved because a configuration data in or on the movement in the open area 13 is accurately obtained by using the millimeter wave sensors 2. Therefore, accuracy for detecting an obstacle is improved.

The safety device 1 is easily manufactured at a low cost because the existing driving control device 7 can be used, if the comparison determination device 5 specifies the position of the roof panel 12 based on a pulse count value of the motor 15.

Second Embodiment

Figure 7:
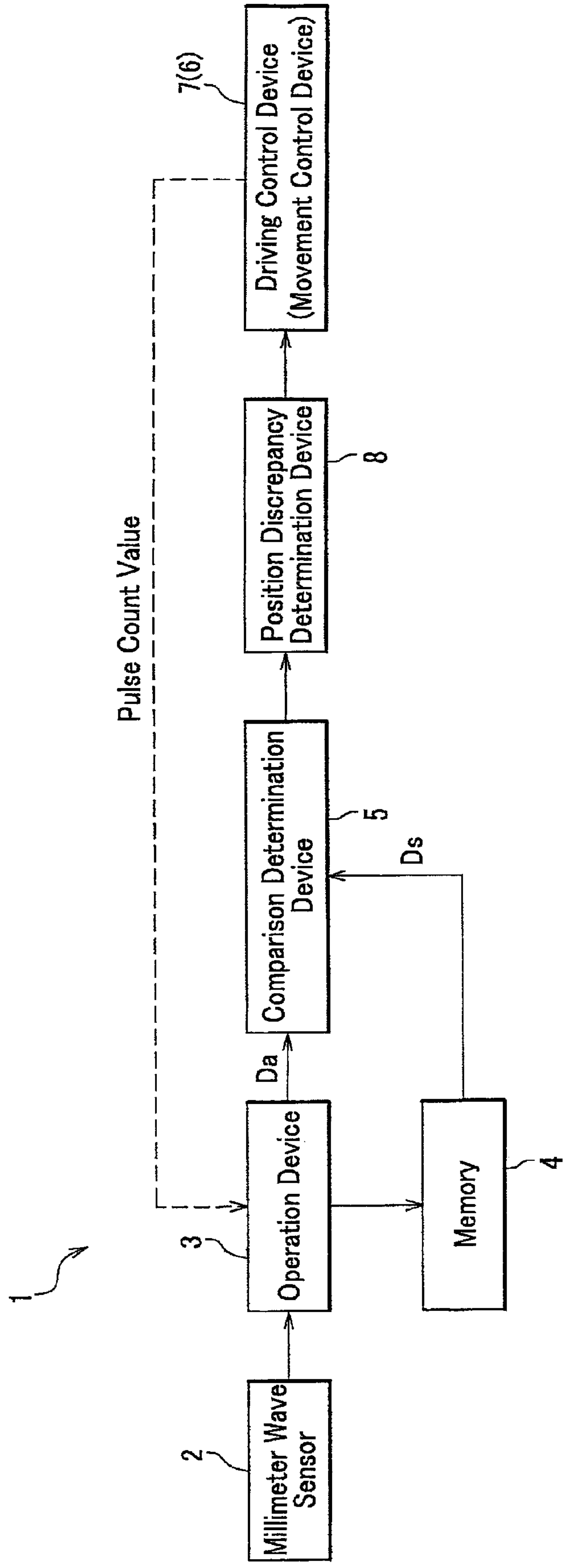
FIG. 7 is a block schematic diagram of a safety device of the second embodiment.

FIG. 7 is a block schematic diagram of the safety device 1 used for a second embodiment. There is difference between the safety device 1 in the second embodiment and the safety device 1 shown in FIG. 1. In the second embodiment, a position discrepancy determination device 8 is additionally provided. If there is a difference between the measured data Da and the reference data Ds in the comparison determination device 5, the position discrepancy determination device 8 compares the measured data Da when the difference arises, with a pre-determined number of the reference data Ds prior to and after the reference data Ds when the difference arises, then, determines that there ought to be a position discrepancy of the roof panel 12 if there is an reference data Ds identical with Da among the pre-determined number of the reference data Ds, and/or determines that there is an obstacle if there is none of the reference data Ds identical with Da among the pre-determined number of the reference data Ds.

The position discrepancy determination device 8 determines that when a difference arises between the measurement data Da and the reference data Da, determines whether the difference is caused by an obstacle or by the roof panel 12 being not positioned as the pulse count value of the motor 15 indicates, namely, a discrepancy with respect to the reference data Ds. The position discrepancy of the roof panel 12 from the pulse count value of the motor 15, ought to occur due to a friction force of the roof panel 12 or a load applied by such an external force as applied to the roof panel 12 by an obstacle hitting the roof panel 12. In this case, a discrepancy as large as several mm to several tens of mm may be caused on the opening-closing position.

When a difference arises between the measured data Da and the reference data Ds in the comparison determination device 5, which are referred to as Dai and Dsi respectively, the position discrepancy determination device 8 reads out a pre-determined number of the reference data prior to and after Dsi, reading out at least one of the following data from the memory 4: Ds(i+1), Ds(i+2), - - - , Ds(i+n), Ds(i−1), Ds(i−2), - - - , Ds(i−n), and compares each of these read out data with the measured data Dai. This pre-determined number of the reference data is optionally chosen. If either of these read out data is identical with Dai, it is determined that there is a discrepancy only on the position on the roof panel 12, and that there is an obstacle only if there is not any of these read out data that is identical with Dai. If it is determined that there is an obstacle, a movement of the roof panel 12 is changed to the pre-determined movement such as a stop by the movement control device 6.

As a result, if the position discrepancy determination device 8 is provided in the safety device 1, the position discrepancy of the opening-closing unit (the roof panel 12) can be specified, and decreases the incidence of a detection error caused by a factor other than an obstacle. Therefore detection accuracy on an obstacle is improved. If the position discrepancy determination device 8 determines that there is a position discrepancy of the roof panel 12, the position discrepancy is corrected, for example, by the method mentioned in Japanese Laid-Open Patent Application No. JP2005-290938.

Third Embodiment

Figure 8:
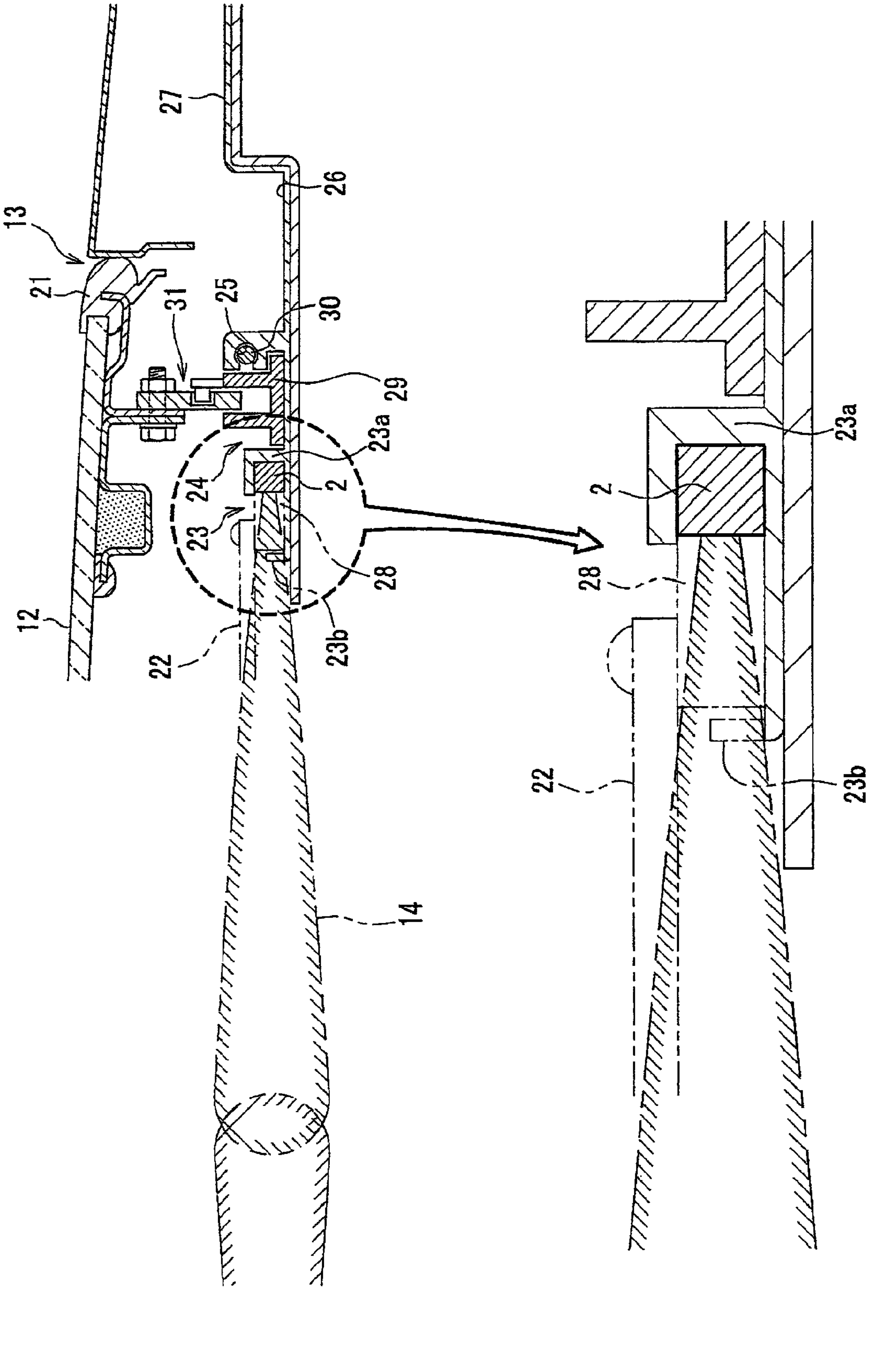
FIG. 8 is an explanation drawing of a cross section of a safety device observed in the longitudinal direction of a vehicle of the third embodiment.

FIG. 8 explains the third embodiment, and is a cross section explanation drawing. The drawing is a B-B cross section in FIG. 2. The embodiment is characterized by the millimeter wave sensors 2 attached on a guide rail for a sunshade panel of a sun roof device, if the detectable area 14 is set to an area on a closing side edge of the opening area 13 (front edge area as shown in FIG. 2), that is, a front space of the opening area 13.

Under the side edge in the opening area 13, a side frame 27 made of an extruded aluminum alloy is attached in a longitudinal direction. The side frame 27 is formed integrally with a guide rail 23 guiding a sunshade slider 28 connected with a sunshade panel 22, a guide rail 24 guiding a slider 29 composing a known tilt slide mechanism 31 joined with the roof panel 12, a cable groove 25 to pass through a push-pull cable 30, and a drain ditch 26 to discharge rain water, which are formed in this order from the center of the vehicle center. The guide rails 23 and 24 are divided by a vertical separation wall 23*a*. In FIG. 8, the sunshade panel 22 and the sunshade slider 28 are indicated with virtual lines. A surrounding structure of the side frame 27 is substantially the same as that shown in FIG. 2 in Japanese Laid-Open Patent Application No. 2006-327353.

The sunshade panel 22 is configured to open simultaneously when the roof panel 12 opens, but the sun shade panel 22 closes independently of the roof panel 12. Since the millimeter wave sensor 2 is attached close to the front edge of the guide rail 23, the millimeter wave sensor 2 does not interfere with the sunshade slider 28. A part of a wall unit 23*b* which is a portion of the guide rail 23 may be appropriately cut off so that millimeter waves pass through.

Since the millimeter wave sensor 2 is attached on the guide rail 23 which is utilized for the sunshade panel 22, a space to attach the millimeter wave sensor 2 is made smaller. Because the detectable area 14 is arranged under the roof panel 12, that is, inside a vehicle, only a caught-in accident of the passenger can be reliably detected.

As mentioned above, the suitable embodiment has been explained on the present invention, however, the present invention is not restricted to the above mentioned embodiments, thus, a variety of design changes are possible without deviating from the scope of the invention. For example, with respect to a vehicle opening-closing device of the present invention may be applied to a power window device of a side door and an electric sliding side door device besides a sun roof device.

Figure 10:
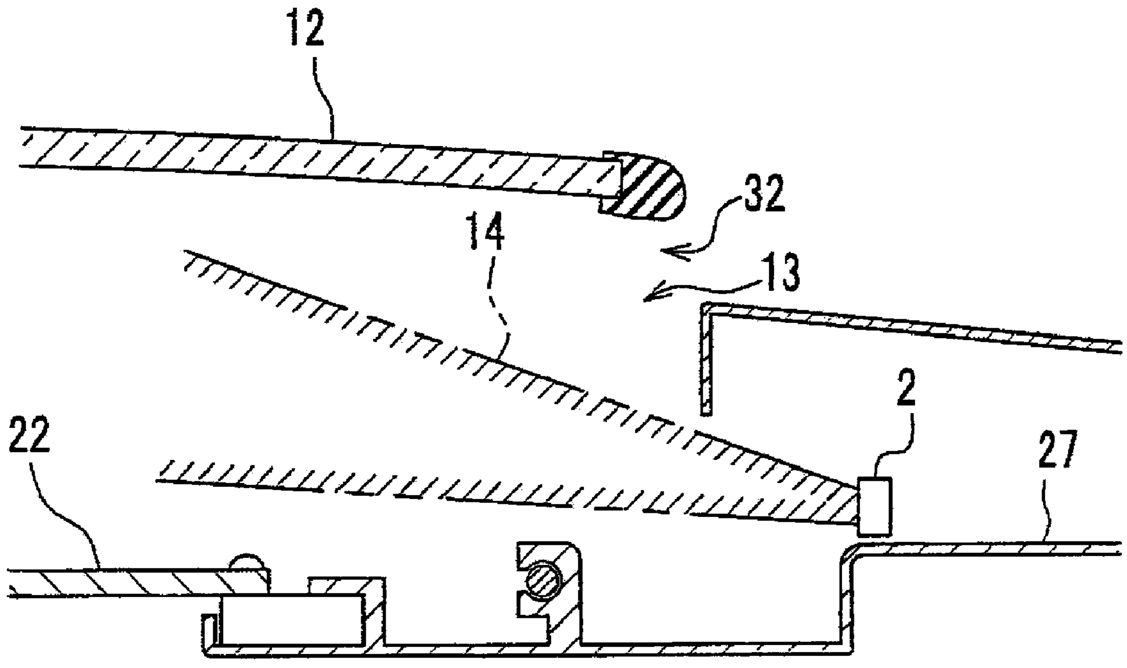
FIG. 10 is an explanation drawing of a cross section of a roof panel of a sun roof device being tilted down, to which the present invention is applied, the roof panel seen in the longitudinal direction of the vehicle.

In this embodiment in which the roof panel 12 is configured to be tilted up, the safety device of the present invention can be applied when the roof panel is being tilted down. As shown in FIG. 10, an open space 32 is forced between a vehicle roof and a rear edge of the roof panel 12 that is kept tilted up, and a millimeter wave is emitted from the millimeter wave sensor 2 toward the open space 32 which the roof panel 12 is being tilted down. The specific detection method in this case is based on the method explained in FIG. 1. The millimeter wave sensor 2 for example, are attached over the sunshade panel 22 and on both rear edges of the opening area 13, and for instance, specifically are attached on the side flame 27 as shown in FIG. 8 and the vehicle body. In this case, for example, the millimeter wave sensor 2 is attached to face the center of the opening area 32 in the vehicle width direction and millimeter waves are emitted in an obliquely upper direction.

The sun roof device becomes safer by detecting an obstacle with the millimeter wave sensor 2 when the roof panel 12 is sliding as well as when the roof panel 12 is being tilted down.

As explained in the embodiment, it a sunroof device is an outer slide type attached on a vehicle roof and kept opened, a millimeter wave sensor determines whether an obstacle exists or not in the movement zone of the roof panel 12. If an obstacle, which is such a structural object, grass or tree in the vicinity of the roof, is detected, a collision of the obstacle with the roof panel 12 is prevented by stopping the roof panel 12 from moving or reversing the movement of the roof panel 12.

Millimeter wave sensors may be attached on a rear edge area of the roof panel 12, further, can be attached on the vehicle roof.

What is claimed is:

1. A safety device in an opening-closing device of a vehicle, the opening-closing device including an opening-closing unit for opening to form an opening area on a vehicle body and closing the opening area, the safety device comprising:

a millimeter wave sensor attached on the vehicle body;

a memory containing reference data of a periphery of the opening area, the reference data being associated with each position of the opening-closing unit as measured by the millimeter wave sensor without an obstacle in the opening area;

a comparison determination device for comparing measured data of the periphery of the opening area with the reference data stored in the memory, wherein the measured data is continually measured by the millimeter wave sensor attached on the vehicle body while the opening-closing unit is closing, and wherein the comparison determination device determines whether there is an obstacle or not in the opening area based on a difference between the measured data and the reference data when compared for the same position of the opening-closing unit; and a movement control device for changing a movement of the opening-closing unit to a pre-determined movement if the comparison determination device determines that there is the obstacle in the opening area.

2. The safety device of an opening-closing unit of a vehicle according to claim 1, wherein the opening-closing unit is driven by a pulse motor and the comparison determination device specifies the position of the opening-closing unit based on a pulse count value of the pulse motor.

3. The safety device of an opening-closing device of a vehicle according to claim 1, wherein a detectable area of the millimeter wave sensor is set to an area on a closing side edge of the opening area.

4. The safety device of an opening-closing device of a vehicle according to claim 2, wherein a detectable area of the millimeter wave sensors is set to an area on a closing side edge of the opening area.

5. The safety device in an opening-closing device of a vehicle according to claim 1, further comprising a position discrepancy determination device which compares the measured data when a difference arises between the measured data and the reference data with at least one of a predetermined number of the consecutive reference data prior to and after the reference data, determines that there is a position discrepancy on the opening-closing unit, if the measured data is identical with either of the compared reference data and determines that there is the obstacle in the opening area if the measured data is not identical with any of the compared reference data.

6. The safety device in an opening-closing device of a vehicle according to claim 2, further comprising a position discrepancy determination device which compares the measured data when a difference arises between the measured data and the reference data with at least one of a predetermined number of the consecutive reference data prior to and after the reference data, determines that there is a position discrepancy on the opening-closing unit if the measured data is identical with either of the compared reference data and determines that there is the obstacle in the opening area if the measured data is not identical with any of the compared reference data.

7. The safety device in an opening-closing device of a vehicle according to claim 3, further comprising a position discrepancy determination device which compares the measured data when a difference arises between the measured data and the reference data with at least one of a predetermined number of the consecutive reference data prior to and after the reference data, determines that there is a position discrepancy on the opening-closing unit if the measured data is identical with either of the compared reference data and determines that there is the obstacle in the opening area if the measured data is not identical with any of the compared reference data.

8. The safety device in an opening-closing device of a vehicle according to claim 4, further comprising a position discrepancy determination device which compares the measured data when a difference arises between the measured data and the reference data with at least one of a predetermined number of the consecutive reference data prior to and after the reference data, determines that there is a position discrepancy on the opening-closing unit if the measured data is identical with either of the compared reference data and determines that there is the obstacle in the opening area if the measured data is not identical with any of the compared reference data.

9. The safety device in an opening-closing device of a vehicle according to claim 1, wherein the opening-closing unit is a roof panel of a sun roof device which slides forward and backward to open and close and of which a front edge portion is in a gently curved convex shape, and wherein the millimeter wave sensor is attached on each side edge of the opening area so that no area in the opening area located on a half portion of a front edge from a center of the front edge remains a blind spot which the millimeter wave does not reach due to the gently curved convex shape.

10. The safety device in an opening-closing device of a vehicle according to claim 2, wherein the opening-closing unit is a roof panel of a sun roof device which slides forward and backward to open and close and of which a front edge portion is in a gently curved convex shape, and wherein the millimeter wave sensor is attached on each side edge of the opening area so that no area in the opening area located on a half portion of a front edge from a center of the front edge remains a blind spot which the millimeter wave does not reach due to the gently curved convex shape.

11. The safety device in an opening-closing device of a vehicle according to claim 3, wherein the opening-closing unit is a roof panel of a sun roof device which slides forward and backward to open and close and of which a front edge portion is in a gently curved convex shape, and wherein the millimeter wave sensor is attached on each side edge of the opening area so that no area in the opening area located on a half portion of a front edge from a center of the front edge remains a blind spot which the millimeter wave does not reach due to the gently curved convex shape.

12. The safety device in an opening-closing device of a vehicle according to claim 4, wherein the opening-closing unit is a roof panel of a sun roof device which slides forward and backward to open and close and of which a front edge portion is in a gently curved convex shape, and wherein the millimeter wave sensor is attached on each side edge of the opening area so that no area in the opening area located on a half portion of a front edge from a center of the front edge remains a blind spot which the millimeter wave does not reach due to the gently curved convex shape.

13. The safety device in an opening-closing device of a vehicle according to claim 5, wherein the opening-closing unit is a roof panel of a sun roof device which slides forward and backward to open and close and of which a front edge portion is in a gently curved convex shape, and wherein the millimeter wave sensor is attached on each side edge of the opening area so that no area in the opening area located on a half portion of a front edge from a center of the front edge remains a blind spot which the millimeter wave does not reach due to the gently curved convex shape.

14. The safety device in an opening-closing device of a vehicle according to claim 6, wherein the opening-closing unit is a roof panel of a sun roof device which slides forward and backward to open and close and of which a front edge portion is in a gently curved convex shape, and wherein the millimeter wave sensor is attached on each side edge of the opening area so that no area in the opening area located on a half portion of a front edge from a center of the front edge remains a blind spot which the millimeter wave does not reach due to the gently curved convex shape.

15. The safety device in an opening-closing device of a vehicle according to claim 7, wherein the opening-closing unit is a roof panel of a sun roof device which slides forward and backward to open and close and of which a front edge portion is in a gently curved convex shape, and wherein the millimeter wave sensor is attached on each side edge of the opening area so that no area in the opening area located on a half portion of a front edge from a center of the front edge remains a blind spot which the millimeter wave does not reach due to the gently curved convex shape.

16. The safety device in an opening-closing device of a vehicle according to claim 8, wherein the opening-closing unit is a roof panel of a sun roof device which slides forward and backward to open and close and of which a front edge portion is in a gently carved convex shape, and wherein the millimeter wave sensor is attached on each side edge of the opening area so that no area in the opening area located on a half portion of a front edge from a center of the front edge remains a blind spot which the millimeter wave does not reach due to the gently curved convex shape.

17. The safety device of an opening-closing device of a vehicle according to claim 9, wherein the sunroof device comprises a sunshade panel disposed under the roof panel, each side edge of which is supported by a guide rail, and wherein the millimeter wave sensor is attached on each of the guide rails.

18. The safety device in an opening-closing device of a vehicle according to claim 1, wherein the opening-closing unit is a roof panel of a sun roof device, which is configured to be tilted up, and wherein the obstacle is detected by the millimeter wave sensor when the roof panel is sliding as well as when the roof panel is being tilted down.

* * * * *